US006988189B1

(12) United States Patent
O'Connor et al.

(10) Patent No.: US 6,988,189 B1
(45) Date of Patent: Jan. 17, 2006

(54) TERNARY CONTENT ADDRESSABLE MEMORY BASED MULTI-DIMENSIONAL MULTI-WAY BRANCH SELECTOR AND METHOD OF OPERATING SAME

(75) Inventors: James Michael O'Connor, Union City, CA (US); Edward Funnekotter, Ottawa (CA); Jon Huie, Raleigh, NC (US)

(73) Assignee: Altera Corporation, San Jose, CA (US)

( * ) Notice: Subject to any disclaimer, the term of this patent is extended or adjusted under 35 U.S.C. 154(b) by 540 days.

(21) Appl. No.: 09/703,337

(22) Filed: Oct. 31, 2000

(51) Int. Cl.
G06F 9/40 (2006.01)
G06F 9/44 (2006.01)

(52) U.S. Cl. ........................ 712/235; 712/240
(58) Field of Classification Search ........... 712/236, 712/24, 223, 224, 240, 235, 239; 711/123, 711/125, 213, 220, 209, 128, 129
See application file for complete search history.

(56) References Cited

U.S. PATENT DOCUMENTS

| | | | | | |
|---|---|---|---|---|---|
| 4,907,192 A | * | 3/1990 | Kaneko | ...................... | 712/236 |
| 5,423,011 A | * | 6/1995 | Blaner et al. | ............... | 712/240 |
| 5,729,707 A | * | 3/1998 | Maki | .......................... | 712/207 |
| 6,112,299 A | * | 8/2000 | Ebcioglu et al. | ............ | 712/236 |
| 6,167,510 A | * | 12/2000 | Tran | ............................ | 712/239 |
| 6,256,728 B1 | * | 7/2001 | Witt et al. | ................... | 712/236 |

* cited by examiner

Primary Examiner—Dan Pan
(74) Attorney, Agent, or Firm—Martine Penilla & Gencarella, LLP

(57) ABSTRACT

An embodiment of the present invention described and shown in the specification and drawing is a Ternary Content Addressable Memory (TCAM) multi-dimensional multi-way branch selector. The embodiment that is disclosed includes a wide TCAM and a pre-TCAM multi-field multi-mode comparator for coupling to a microprocessor for performing multi-way branching decisions based on multi-dimensional comparisons. It is emphasized that this abstract is provided to comply with the rule requiring an abstract which will allow a searcher or other reader to quickly ascertain the subject matter of the technical disclosure. It is submitted with the understanding that it will not be used to interpret or limit the scope or meaning of the claims.

25 Claims, 9 Drawing Sheets

```
if (chksumResult == FAIL) {
      goto Discard_Packet
}
elsif ((protocol == IP_PROTOCOL) && (ipVersion == IPv4) && (ihl == 20))
{
      goto IP_Protocol_V4_Handler_No_Options
}
elsif ((protocol == IP_PROTOCOL) && (ipVersion == IPv4) && (ihl > 20)){
      goto IP_Protocol_V4_Option_Handler
}
elsif ((protocol == IP_PROTOCOL) && (ipVersion == IPv4) && (ihl < 20)){
      goto IP_Protocol_V4_Invalid_Size
}
elsif ((protocol == IP_PROTOCOL) && (ipVersion == IPv6)){
      goto IP_Protocol_V6_Handler
}
elsif (protocol == MPLS_Protocol)){
      goto MPLS_Protocol_Handler
}
elsif (protocol == ICMP_Protocol)){
      goto MPLS_Protocol_Handler
}
.
.
.
.
```

Fig. 1

| if/elsif case number | Group Id | TCAM Comparison Fields (for this Group Id) | | | | | Pre-TCAM Results | Description |
|---|---|---|---|---|---|---|---|---|
| | | event | elevator State | elevator Dir | numFloors OnStopList | numFloors OnQueue | | |
| 1 | 00000001 | 00000001 | 00000001 | ******** | ******** | ******** | ******** | event == 1 && elevatorState == 1 |
| 2 | 00000001 | 00000001 | ******** | 00000001 | ******** | ******** | ******** | event == 1 && elevatorDir == 1 |
| 3 | 00000001 | 00000010 | ******** | 00000010 | ******** | ******** | 11****** | event == 2 && elevatorDir == 2 && currentFloor > buttonPressedFloor If pre-TCAM result bits 6 and 7 are both 1, it indicates that the first comparison in the pre-TCAM comparison was greater-than |
| 4 | 00000001 | 00000010 | ******** | ******** | ******** | ******** | *0****** | event == 2 && currentFloor <= buttonPressedFloor If pre-TCAM result bit 6 is set to 0, it indicates that the first comparison in the pre-TCAM comparison was less-than or equal |
| 5 | 00000001 | 00000001 | 00000010 | ****** | **** | **** | 00**** | event == 1 && currentFloor == nextStopFloor If pre-TCAM result bits 4 and 5 are both 0, it indicates that the second comparison in the pre-TCAM comparison was equal |
| 6 | 00000001 | 00000011 | 00000011 | ******** | 00000000 | 00000000 | ******** | event == 3 && elevatorState == 3 && numFloorsOnStopList == 0 && numFloorsOnQueue == 0 |
| 7 | 00000001 | 00000011 | 00000011 | ******** | 00000000 | ******** | ******** | event == 3 && elevatorState == 3 && numFloorsOnStopList == 0 |
| 8 | 00000001 | 00000011 | 00000011 | ******** | ******** | 00000000 | ******** | event == 3 && elevatorState == 3 && numFloorsOnQueue == 0 |
| 9 | 00000001 | 00000011 | 00000011 | ******** | ******** | ******** | ******** | event == 3 && elevatorState == 3 |

Fig. 10

TERNARY CONTENT ADDRESSABLE MEMORY BASED MULTI-DIMENSIONAL MULTI-WAY BRANCH SELECTOR AND METHOD OF OPERATING SAME

FIELD OF THE INVENTION

The present invention relates generally to a multi-dimensional multi-way branch selector and mechanism.

BACKGROUND OF THE INVENTION

A description of the prior art can be found in U.S. Pat. No. 6,076,141, issued Jun. 13, 2000, and entitled "Look-up switch accelerator and method of operating same." The prior art that is described in the U.S. Pat. No. 6,076,141 enables the acceleration of a switch statement within a general purpose processor. It describes the ability to quickly perform simple, one-dimensional look-up switch statements in order to accelerate switch statements commonly found in some programming languages, such as JAVA.

The type of processor-coprocessor as described in U.S. Pat. No. 6,076,141 is quite useful for optimizing simple switch statements, where a given value is compared to achieve an exact match with one of many constant values. Table 1 below illustrates an exemplary set of switch statements that can be accelerated by the processor-coprocessor as described by the patent.

TABLE 1

```
SWITCH (SHAPE)
    RECTANGLE: BEGIN
        .
        .
        .
    END
    CIRCLE: BEGIN
        .
        .
        .
    END
    TRIANGLE: BEGIN
        .
        .
        .
    END
    DEFAULT: BEGIN
        .
        .
        .
    END
```

In this example, the value stored in the variable 'SHAPE' must have an exact match with the constant values in each of the cases below it—'RECTANGLE', 'CIRCLE', etc.

For the switch statement above, the look-up switch accelerator will improve its execution performance. In other situations, where more than one dimension are required in making a decision on which code path to execute, it is entirely inadequate and provides no benefit at all.

An exemplary set of multi-dimensional switch statements that cannot be accelerated by the processor-coprocessor described in U.S. Pat. No. 6,076,141 is illustrated in Table 2 below.

TABLE 2

```
IF ((SHAPE1 == CIRCLE) && (SHAPE2 == RECTANGLE) &&
(SHAPE3 == OVAL)) BEGIN
    .
    .
    .
END
ELSIF ((SHAPE2 == CIRCLE) && (SHAPE3 == RECTANGLE))
    .
    .
    .
END
ELSIF ((SHAPE1 == RECTANGLE) && (SHAPE4 == OVAL))
    .
    .
    .
END
ELSIF ((SHAPE2 == TRIANGLE) && (SHAPE4 == RECTANGLE))
    .
    .
    .
END
ELSIF ((SHAPE1 == PENTAGON) && (SHAPE4 == DECAGON))
    .
    .
    .
END
ELSE
    .
    .
    .
END
```

The example of Table 2 above shows a very simple multi-dimensional decision. The code could be written as a switch statement in order to make use of the look-up switch accelerator, but it would be more efficient to keep the code as is and to execute each comparison sequentially as would be done in a conventional processor. The look-up switch accelerator is unable to handle simultaneous multi-dimensional comparisons.

Another significant shortfall of the processor-coprocessor in U.S. Pat. No. 6,076,141 is its inability to perform comparisons between dynamic values within the switch statement. The value being compared is always compared to constant values. It is not possible to perform what is shown in the Table 3 below.

TABLE 3

```
// SHAPE1 and SHAPE2 are variables
SWITCH (SHAPE1)
    RECTANGLE:  // This is OK
    END
    SHAPE2:     // SHAPE2 is a variable - it can't appear here
    END
```

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 1 illustrates exemplary code containing multiple "if" and "elsif" statements.

FIG. 10 illustrates exemplary TCAM entries that an exemplary modified branch-decision key of the present invention may be compared against.

DETAILED DESCRIPTION

A. Overview

As data networking around the world increases, network processors inside Internet routers have to contend with faster and faster data rates at the same time as demands for extra features increases. These network processors must increase their own performance and make optimizations in certain areas in order to cope with these demands.

Part of the reason that network processors are required to perform additional work is due to the increasing number of protocols and variations of those protocols that Internet routers support. As the number of protocols and variations of protocols increases, the amount of time that network processors spend selecting the correct code path increases. With a conventional network processor, a significant portion of the processing time may be spent solely choosing code paths.

FIG. 1 illustrates a simple situation where a network processor determines which code paths to take. While the code in FIG. 1 could be slightly optimized to be more efficient, there is no way to write it for conventional processors to avoid the generated microcode from performing a series of sequential comparisons, each followed by a conditional branch. As branching decisions become more complex, these sequential operations can lead to hundreds of instructions that need to be executed in order to make a single branch decision. These instructions essentially are wasted processing time since no useful work has been accomplished.

According to one aspect of the present invention, sequential comparisons can be avoided by using a Ternary Content Addressable Memory (TCAM). The TCAM allows parallel comparisons in multiple dimensions, with the ability to select which dimensions should be included in the comparison on a per-entry basis. Being able to select which dimensions have the comparisons applied allows for great flexibility and power when performing multi-way branch decisions. In one embodiment, when a match is made within the TCAM, the TCAM returns the next instruction for the processor to execute. In another embodiment, the TCAM provides a reference (e.g., jump offset value) to the next instruction so that the processor can retrieve the instruction itself.

Figure 2:
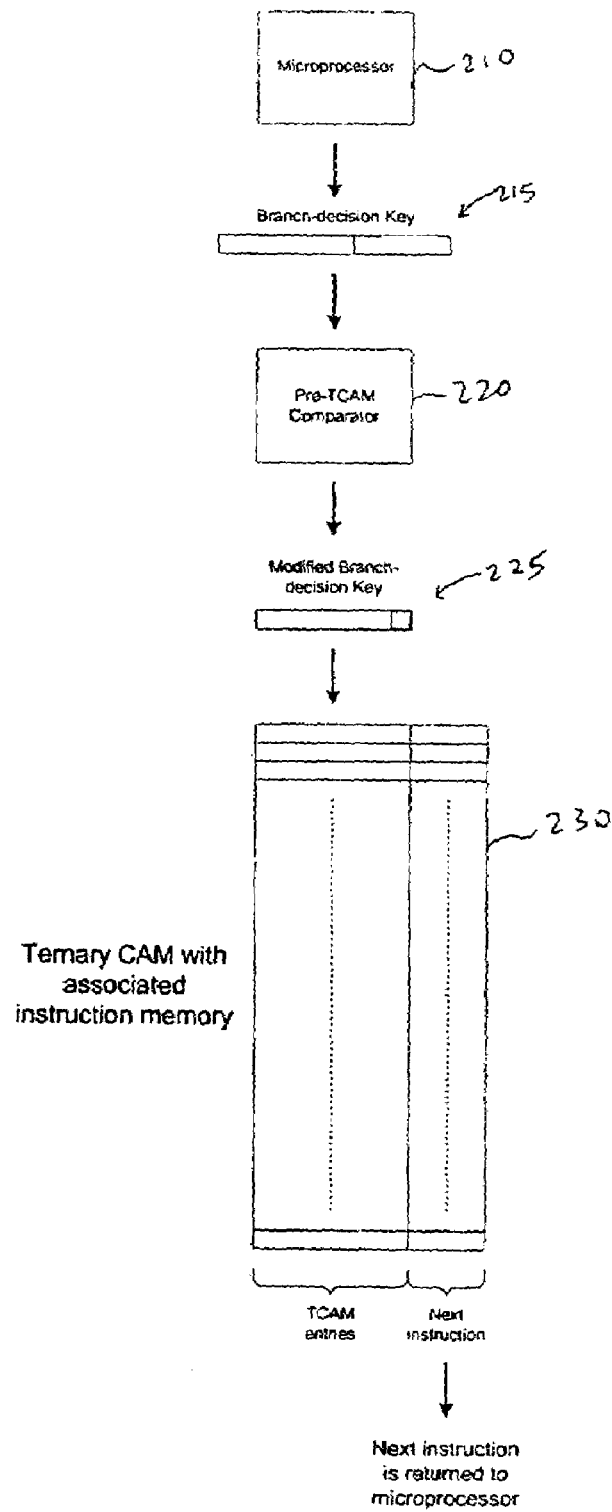
FIG. 2 is a block diagram illustrating a simultaneous multiple-dimension multiple-way branch selection method in accordance with an embodiment of the invention.

FIG. 2 is a block diagram illustrating a simultaneous multiple-dimension multiple-way branch selection method in accordance with an embodiment of the invention. As shown in FIG. 2, a branch-decision key 215 is generated within a microprocessor 210 and contains all the fields on which comparisons will be made, as well as a group identifier that will uniquely identify a group of branch decisions from other groups.

The branch-decision key 215 is presented to the pre-TCAM comparator 220 that will remove some of the fields in order to perform a set of comparisons amongst themselves. Each of these comparisons will generate a group of comparison result bits that indicate the results of the comparison, e.g., equal, not equal, greater than or less than. These bits will be concatenated with the remaining bits of the branch-decision key in order to generate a modified branch-decision key 225, which is provided to a TCAM 230.

The TCAM 230 performs a match on the modified branch-decision key 225 against its previously configured entries. If multiple matches are found, the first entry matched will be returned by the TCAM 230. If no matches are found, an error status is returned by the TCAM 230.

When a match is found, an instruction associated with that entry is returned by the TCAM 230. In this embodiment, the returned instruction is then provided to the processor 210 as an instruction to be subsequently executed. In another embodiment, references to the instructions (e.g., a jump offset value) are stored in the TCAM 230 in association with the entries. In that embodiment, a reference to an instruction associated with the entry is returned by the TCAM 230 when a match is found, and the reference will be used for retrieving an instruction stored within an instruction storage (e.g., instruction memory) of the processor 210.

It should be noted that, in the example illustrated in FIG. 2, the pre-TCAM comparator 220 and the TCAM 230 are external to the microprocessor 210. In an alternate embodiment of the present invention, the pre-TCAM comparator 220 and/or the TCAM 230 may be implemented as part of the instruction fetching mechanisms of the microprocessor 210.

Figure 3:
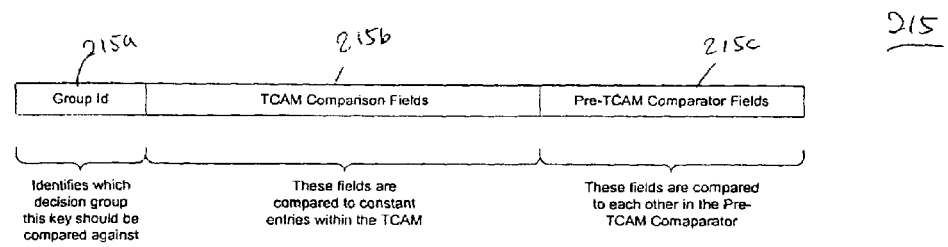
FIG. 3 illustrates an exemplary branch-decision key in accordance with an embodiment of the present invention.

An exemplary branch-decision key 215 is illustrated FIG. 3. As shown in FIG. 3, the branch decision key 215 includes three types of data fields: Group ID fields 215a, TCAM comparison fields 215b, and Pre-TCAM comparator fields 215c. Data stored within the Group ID fields 215a identify which decision group the branch decision key should be compared against. Data stored in the TCAM comparison fields 215b are for comparing to constant entries within the TCAM 230. The Pre-TCAM comparator fields 215c contain data that are for comparing to each other by the Pre-TCAM comparator to produce comparison result bits. In one embodiment, the Pre-TCAM comparator fields 215c are removed by the Pre-TCAM comparator 220. It should be noted that the Pre-TCAM comparator fields 215c do not have to be removed. In those embodiments, the Pre-TCAM comparator fields 215c remain as part of the modified branch decision key.

Figure 4:
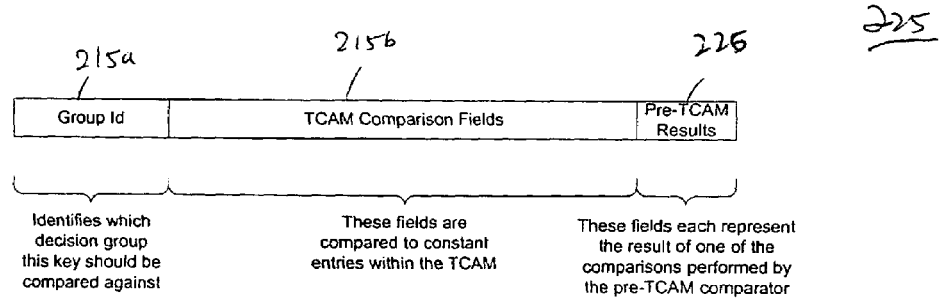
FIG. 4 illustrates an exemplary modified branch-decision key in accordance with an embodiment of the present invention.

An exemplary modified branch-decision key 225 is illustrated in FIG. 4. As illustrated in FIG. 4, the modified branch decision key 225 includes Group ID fields 215a, TCAM comparison fields 215b, and Pre-TCAM comparison results fields 226. In the present embodiment, the Pre-TCAM comparison results fields 226 represent the results of one or more comparisons performed by the pre-TCAM comparator 220 on the Pre-TCAM comparator fields 215c of the branch decision key 215.

B. High-Level Component Descriptions

Figure 5:
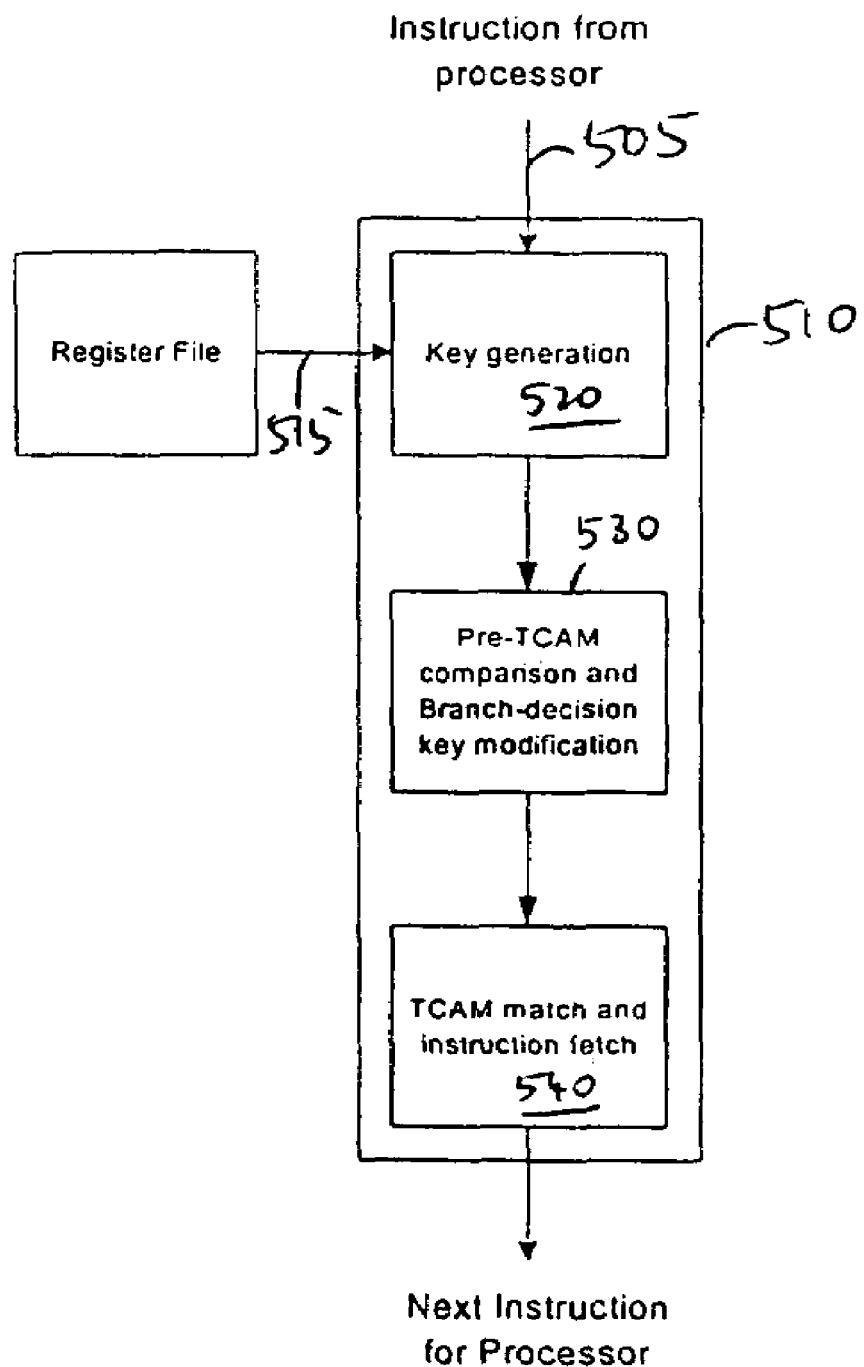
FIG. 5 is a high-level block diagram illustrating components of a TCAM-based multi-dimensional multi-way branch selector according to an embodiment of the present invention.

At a high level, the TCAM-based multi-dimensional multi-way branch selector, according to one embodiment of the present invention, includes the following components: (a) a Branch-decision key generator, (b) a Pre-TCAM Comparator, and (c) a TCAM and/or associated instruction store. FIG. 5 illustrates these components in a pipelined manner. Particularly, FIG. 5 illustrates a TCAM-based multi-dimensional multi-way branch selector 510 that is embedded a processor and that includes a key generation unit 520, a Pre-TCAM comparator 530, and a TCAM match and instruction fetch unit 540. The key generation unit 520 receives instructions from logic circuits of the processor via an internal instruction bus 505, and data from a register file 550 via an internal data bus 515. In the present embodiment, the instruction specifies the immediate data to be compared and the instruction file provides the immediate data to the key generation unit 520.

Key Generation Unit

Using the instruction and the data from the register file 550, the key generation unit 520 generates a branch-decision key that can be provided to the Pre-TCAM Comparator 530. The key generation mechanism is implementation-dependent, and should be apparent to those of ordinary skill in the art in view of the present disclosure.

Pre-TCAM Comparator

The Pre-TCAM Comparator 530 is responsible for performing comparisons between certain fields within the branch-decision key. In one embodiment, the fields that are given to the Pre-TCAM Comparator 530 are removed and are replaced by a smaller number of bits that indicate the results of the comparisons performed by the Pre-TCAM Comparator 530. In another embodiment, the fields compared by the Pre-TCAM Comparator 530 remain within the branch-decision key and the result bits from the Pre-TCAM Comparator are appended to the end of the branch-decision key.

The Pre-TCAM Comparator 530 is capable of multiple comparisons executed in parallel. The number of possible parallel comparisons is dictated by the specific hardware implementation of the Pre-TCAM Comparator 530.

Figure 6:
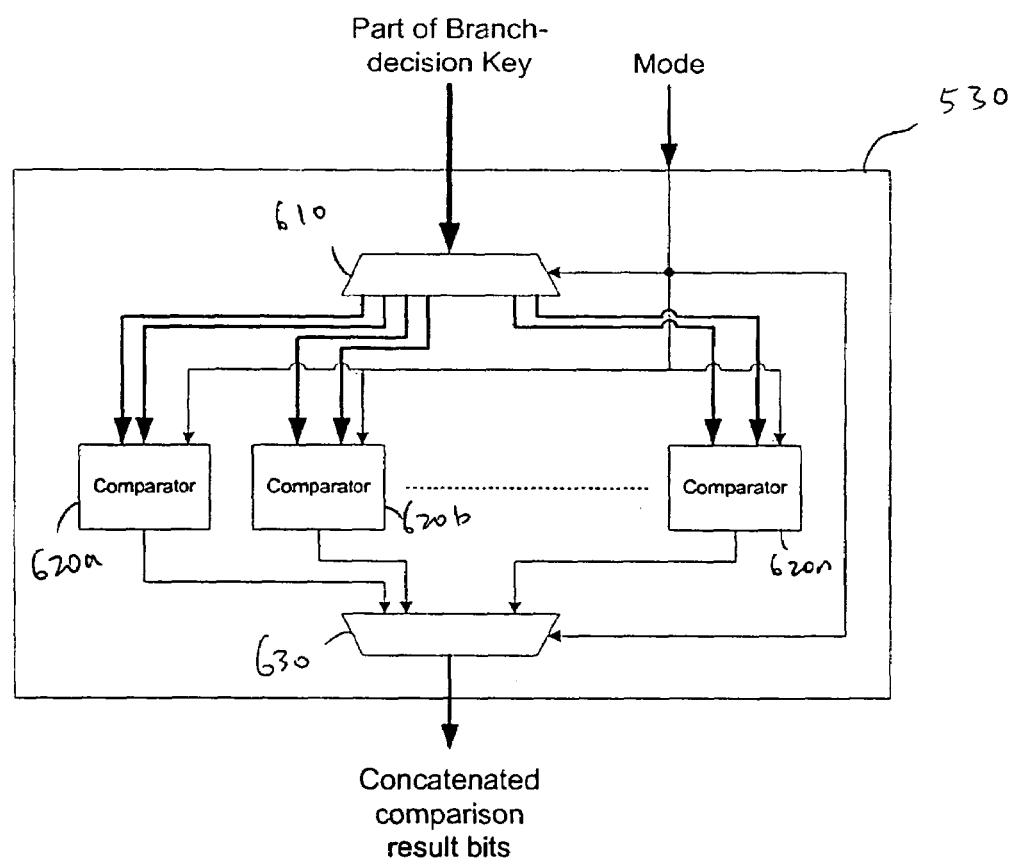
FIG. 6 is a block diagram illustrating an exemplary implementation of a Pre-TCAM Comparator according to an embodiment of the present invention.

An exemplary implementation of a Pre-TCAM Comparator 530 is illustrated in FIG. 6. As illustrated, the Pre-TCAM Comparator 530 receives a portion of the branch-decision key and a MODE control signal that is generated by the key generation unit 520 in accordance with the current instruction. Specifically, in the present embodiment, the Pre-TCAM Comparator 530 is capable of receiving 64 bits of the branch-decision key. The MODE signal specifies one of three operation modes: upper 32 bits compared to lower 32 bits, upper two 16 bit fields compared with each other and lower two 16 bit fields compared with each other, and the first 16 bit field compared independently with each of the other three 16 bit fields. In particular, the MODE signal controls a multiplexer 610 to select different bits of the branch decision key to be provided to the comparators 620a–620n, which are also controlled by the MODE signal.

The outputs of the comparators 620a–620n are then provided to a multiplexer 630. The muliplexer 630 then selects one of the outputs of the comparators 620a–620n, as specified by the MODE signal, to be outputted. The Pre-TCAM Comparator 530 performs the specified operations and output two bits or more bits per comparison to generate a set of comparison results bits.

It should be noted that, although the Pre-TCAM Comparator 530 of the present embodiment is described as being capable of processing 64 bits of branch decision key in one of three comparison modes, it should not be construed as a limitation on the scope of the invention. Rather, Pre-TCAM Comparators that are able to act on more or fewer bits of the branch-decision key and that have more or fewer modes of operation are consistent with the spirit and scope of the present invention.

TCAM and Associated Instruction Store

With reference again to FIG. 5, the TCAM 540 is responsible for performing a multiple dimensional match within itself using the modified branch-decision key that is generated by the Pre-TCAM Comparator 530. The TCAM 540 is partitioned into many groups of entries, with each group of entries representing a separate if/elsif grouping within the written code. Each entry within a group represents an if or elsif clause. Associated with each entry in the TCAM 540 is an instruction. When a match is attempted within the TCAM 540, one or more entries may match. If more than one entry matches, the first match is used. The instruction associated with the matched entry is returned to the processor to execute as its next instruction.

Figure 7:
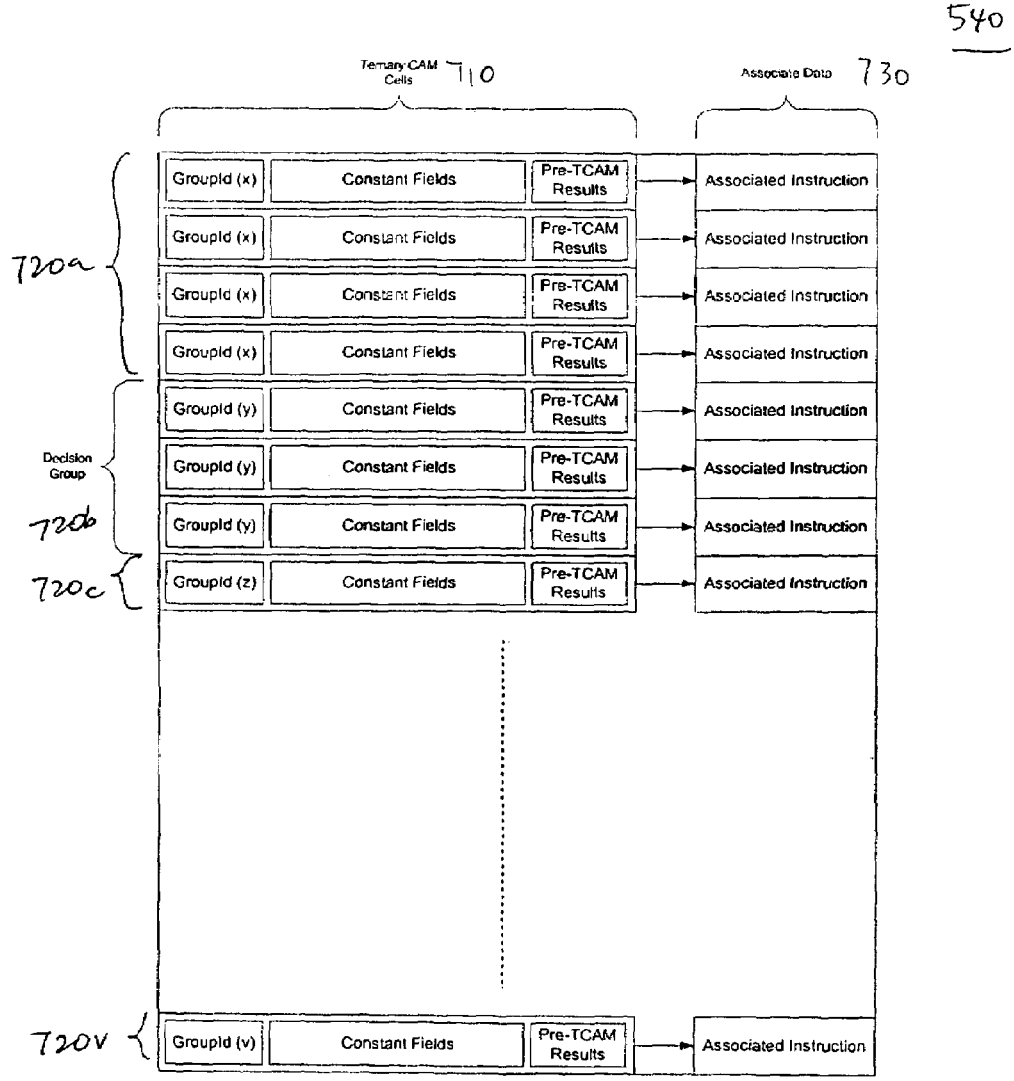
FIG. 7 illustrates the internal format of the TCAM 540 in accordance with an embodiment of the invention.

FIG. 7 illustrates the internal format of the TCAM 540 in accordance with an embodiment of the invention. As illustrated, TCAM 540 includes Ternary CAM cells 710. The Ternary CAM cells 710 contain both the constant values to be matched against by the modified branch decision key, and a bit mask indicating whether a match should be performed using that bit or not. Also shown in FIG. 7 are decision groups 720a–720v, each representing a separate if/elsif grouping. Each entry is associated with an instruction 730. When a match occurs, an instruction that is associated with the matching entry will be provided as an output of the TCAM 540.

C. Operation Method Example

A detailed example of the operation of a TCAM multi-dimensional multi-way branch selector in accelerating multi-dimensional multi-way branching statements is presented below. For simplicity, in the present discussion, it is assumed that the Pre-TCAM Comparator operates on 64 bits of the branch-decision key. Further, it is assumed that the Pre-TCAM Comparator operates in one of two modes: single 16-bit comparison or dual 8-bit comparison. It is also assumed that, in the present example, the TCAM width is 56 bits.

A pseudo-code example containing multi-dimensional multi-way code paths is shown below in Table 4.

TABLE 4

```
// Very simple elevator state machine
// variables:  event (8 bits), elevatorState (8 bits), elevatorDir (8 bits),
//             currentFloor (8 bits), nextStopFloor (8 bits),
//             buttonPressedFloor (8 bits), numFloorsOnStopList (8 bits),
//             numFloorsOnQueue (8 bits)
```

TABLE 4-continued

```
// First check a few error cases - just a sampling, there could be many more
if ((event == APPROACHING_FLOOR) && (elevatorState == IDLE)) {       // case 1
    ElevatorErrorHandler(elevatorState, currentFloor);
}
elsif ((event == APPROACHING_FLOOR) && (elevatorDir == NONE)) {      // case 2
    ElevatorErrorHandler(elevatorState, currentFloor);
}
// Real handlers
elsif ((event == BUTTON_PRESSED) && (elevatorDir == UP) &&
    (buttonPressedFloor > currentFloor)) {                           // case 3
    AddToStopList(buttonPressedFloor);
}
elsif ((event == BUTTON_PRESSED) && (elevatorDir == DOWN) &&
    (buttonPressedFloor <= currentFloor)) {                          // case 4
    AddToQueue(buttonPressedFloor);
}
elsif ((event == APPROACHING_FLOOR) &&
    (elevatorState == MOVING) &&
    (nextStopFloor == currentFloor)) { // case 5
    StopElevatorAndOpenDoors( );
    RemoveFloorFromList(currentFloor);
}
elsif ((event == DOOR_CLOSED) && (numFloorsOnStopList == 0) &&
    (elevatorState == STOPPED) &&
    (numFloorsOnQueue == 0)) {                                       // case 6
    GotoIdleState( );
}
elsif ((event == DOOR_CLOSED) && (numFloorsOnStopList == 0) &&
    (elevatorState == STOPPED) &&
    (elevatorDir == UP)) {                                           // case 7
    // There are floors on the queue - reverse direction and service those floors
    MoveQueueToStopList( );
    elevatorDir = DOWN;
    StartElevator(elevatorDir);
}
elsif ((event == DOOR_CLOSED) && (numFloorsOnStopList == 0) &&
    (elevatorState == STOPPED) &&
    (elevatorDir == DOWN)) {                                         // case 8
    // There are floors on the queue - reverse direction and service those floors
    MoveQueueToStopList( );
    elevatorDir = UP;
    StartElevator(elevatorDir);
}
elsif ((event == DOOR_CLOSED) &&                                     // case 9
    (elevatorState == STOPPED)) {
    // The door has closed and we have floors on the stop list to service
    StartElevator(elevatorDir);
}
elsif
.
.
.
```

In order to execute the code illustrated in Table 4, a branch-decision key is first generated. According to the present invention, the branch-decision key is generated by a hardware key generation unit (e.g., key generation unit 520) that is tightly integrated with the processor. The hardware key generation unit would be aware, through the current instruction being executed, which branch-decision key to generate. In order to execute the code above, a key is generated with fields in both the TCAM Constant Comparison and the Pre-TCAM Variable Comparison sections of the key. For example, a TCAM Constant Comparison section of the branch-decision key may contain the event value to be matched against a constant value DOOR_CLOSED. A Pre-TCAM Variable Comparison section of the key may contain the variable values of, "buttonPressedFloor" and "currentFloor"

Figure 8:
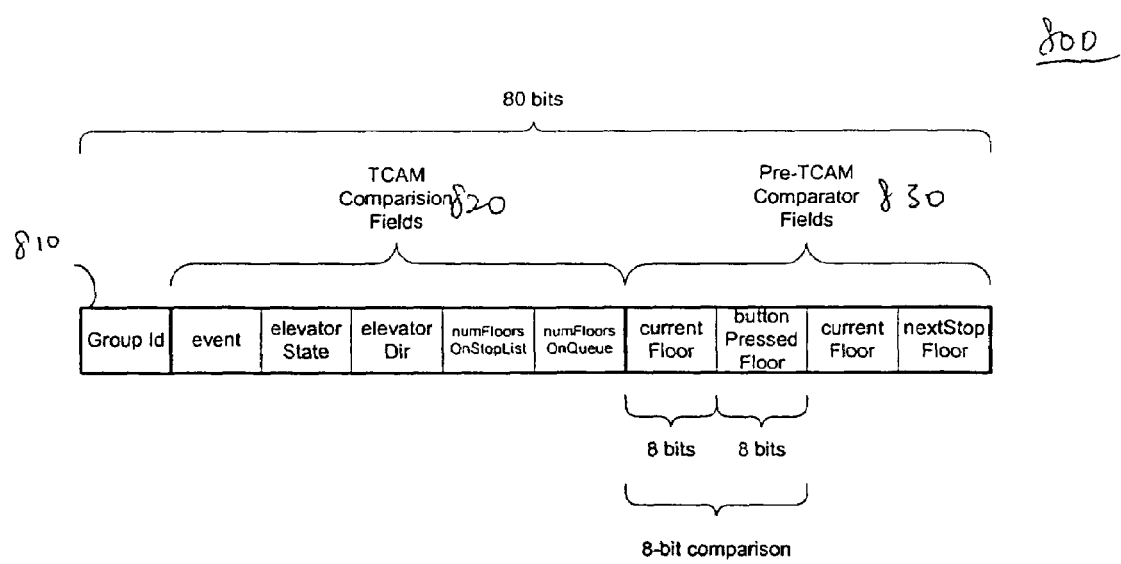
FIG. 8 illustrates the format of an exemplary branch-decision key that may be generated according to the code example shown in Table 4.

FIG. 8 illustrates the format of an exemplary branch-decision key that may be generated according to the code example of Table 4. As illustrated in FIG. 8, the branch-decision key 800 includes a group ID field 810 that identifies the decision group the branch-decision key 800 should be compared against. Branch-decision key 800 further includes TCAM Comparison Fields 820 which contains instruction-specified constants to be compared against the entries of the TCAM. Additionally, branch-decision key 800 includes Pre-TCAM Comparator fields 830 to be used by the Pre-TCAM Comparator to produce comparison results. As shown, the branch-decision key 800 is 80-bit wide.

Figure 9:
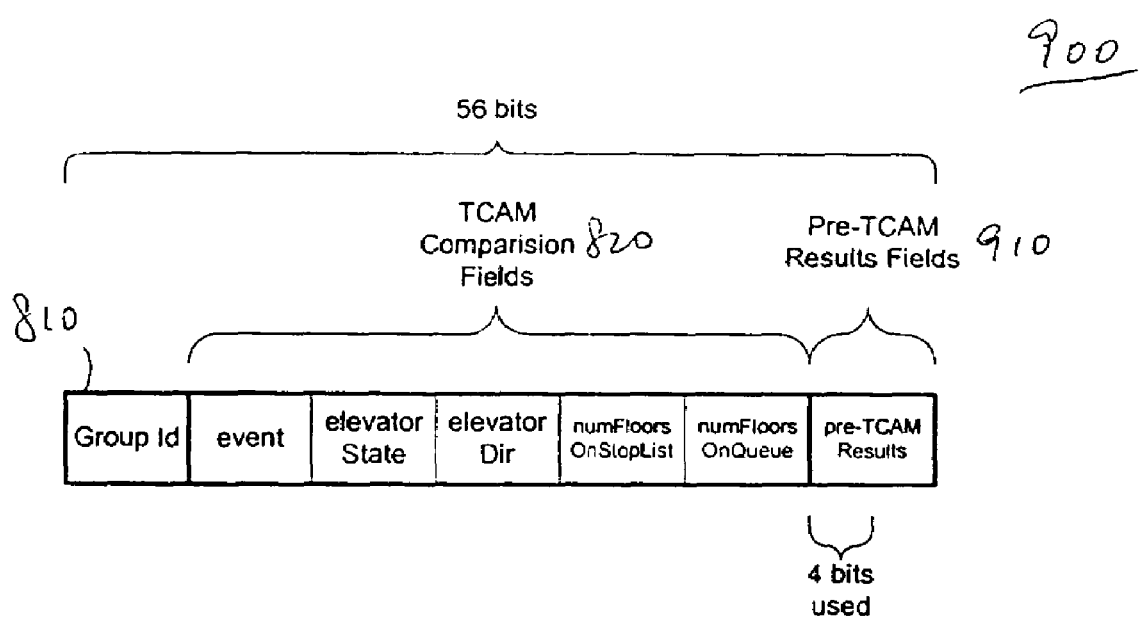
FIG. 9 illustrates the format of an exemplary modified branch-decision key that may be generated according to the code example shown in Table 4.

FIG. 9 illustrates the format of an exemplary modified branch-decision key that may be generated according to the code example of Table 4. As illustrated in FIG. 9, the branch-decision key 900 includes a group ID field 810 and TCAM Comparison Fields 820. Further, modified branch-decision key 900 includes Pre-TCAM Comparator Results fields 910 generated by the Pre-TCAM Comparator. As shown, the modified branch-decision key 900 is 56-bit wide.

FIG. 10 illustrates exemplary TCAM entries that the modified branch-decision key 900 may be compared against. All values are shown in binary and a '*' indicates a "don't care" value. It should be noted that the first column ("if/ elsif" case number) and the last column ("Description") of FIG. 10 are not part of the TCAM entries. These columns are illustrated for the purpose of facilitating the reader in understanding the relationship between the contents of the TCAM and the code example of Table 4.

Table 5 below shows some constant values from the code example of Table 4 and the exemplary TCAM entries of FIG. 10.

TABLE 5

| Constant Name | Description | Value |
| --- | --- | --- |
| APPROACHING_FLOOR | One of the valid values for the event variable | 001 |
| BUTTON_PRESSED | One of the valid values for the event variable | 010 |
| DOOR_CLOSED | One of the valid values for the event variable | 011 |
| IDLE | One of the valid values for the elevatorState variable | 001 |
| MOVING | One of the valid values for the elevatorState variable | 010 |
| STOPPED | One of the valid values for the elevatorState variable | 011 |
| NONE | One of the valid values for the elevatorDir variable | 001 |
| UP | One of the valid values for the elevatorDir variable | 010 |
| DOWN | One of the valid values for the elevatorDir variable | 011 |

D. Network Processing Applications

In the area of high speed network processors, this invention is particularly applicable. In network packet processing, a significant portion of processing time is spent determining the type of packet that was received in order to perform a set of instructions that are relevant to that particular type. As Internet routers become more and more flexible and feature rich, there are an increasing number of different types of packet that can be received. In addition, the rate at which packets can be received is steadily growing. Any optimizations in either hardware or software within the packet processing code allows for higher speed and/or more features.

The TCAM multi-dimensional multi-way branch selector of the present invention, when tightly integrated with a microprocessor, allows the microprocessor to perform a massively parallel comparison function in order to determine the correct code path to take. Table 6 and Table 7 below show exemplary code that will determine a branch to take based on the contents of a received Ethernet packet. The code in Table 6 is written for a conventional processor in order to be as efficient as possible. The code in Table 7 performs the same function as the code in Table 6, but they are written for the TCAM multi-dimensional multi-way branch selector. It should be appreciated that the code is significantly simplified for the purpose of illustration. In practice, additional packet types and protocols would be supported, making this invention even more useful.

In the examples below, it is assumed that the beginning of the packet is stored in the array of 16-bit values called pkt[ ]. It is also assumed that The TCAM comparison portion of the branch-selector key includes the first 14 bytes (or first seven 16-bit words) of the packet.

TABLE 6

```
if (pkt[0] == 0x8100) {
if (pkt[0] == 0x8100) {
    if (pkt[2] == 0x0800) {
        TaggedEthernetIp( );
    }
    elsif (pkt[2] == 0x0806) {
        EthernetArp( );
    }
    elsif (pkt[2] == 0x8847) {
        TaggedEthernetMpls( );
    }
    elsif (pkt[2] == 0x8100) {
        TaggedEthernetTagged( );
    }
    elsif (pkt[2] > 0x5DC) {
        ReceiveError(ERROR_UnexpectedEtherType);
    }
    else {
        ReceiveError(ERROR_InvalidTaggedFrame);
    }
}
elsif ((pkt[3] == 0xAAAA) && (pkt[4] == 0x0300) &&
  (pkt[5] == 0x0000)) {
    if (pkt[6] == 0x0800) {
        TaggedEthernetIp( );
    }
    elsif (pkt[6] == 0x0806) {
        TaggedEthernetArp( );
    }
    elsif (pkt[6] == 0x8847) {
        TaggedEthernetMpls( );
    }
    else {
        ReceiveError(ERROR_UnexpectedEtherType);
    }
}
elsif (pkt[0] == 0x0800) {
    EthernetIp( );
}
elsif (pkt[0] == 0x0806) {
    EthernetArp( );
}
elsif (pkt[0] == 0x8847) {
    EthernetMpls( );
}
elsif (pkt[0] > 0x5DC) {
    ReceiveError(ERROR_UnexpectedEtherType);
}
elsif ((pkt[1] == 0xAAAA) && (pkt[2] == 0x0300) &&
  (pkt[3] == 0x0000)) {
    if (pkt[4] == 0x0800) {
        EthernetIp( );
    }
    elsif (pkt[4] == 0x0806) {
        EthernetArp( );
    }
    elsif (pkt[4] == 0x8847) {
        EthernetMpls( );
    }
    else {
        ReceiveError(ERROR_UnexpectedEtherType);
    }
}
else {
    ReceiveError(ERROR_InvalidPacket);
}
```

In the exemplary code above, which is written for a conventional microprocessor, the shortest path of processing occurs if the first two "if" cases succeed. This would mean that only two comparisons have been performed. In the worst case, the code path would lead to the second last error in the example above, causing twelve individual comparisons to be made before a code path could be selected.

In sharp contrast to the exemplary code above, the code written for the TCAM multi-way branch selector in Table 7 is much more efficient. The code does not have a best case or a worst case. Since all comparisons are performed in parallel, essentially only one comparison should be counted for the pre-TCAM stage and one comparison for the TCAM stage itself. Since network processors are typically multi-threaded and the TCAM multi-way branch selector is fully deterministic, these two stages could be pipelined, further increasing the parallel nature of this invention. Adding additional "elsif" clauses does not change the processing time it takes to execute the code.

TABLE 7

```
if ((pkt[0] == 0x8100) && (pkt[2] == 0x0800)) {
    TaggedEthernetIp( );
}
elsif    ((pkt[0] == 0x8100) && (pkt[2] == 0x0806)) {
    EthernetArp( );
}
elsif    ((pkt[0] == 0x8100) && (pkt[2] == 0x8847)) {
    TaggedEthernetMpls( );
}
elsif    ((pkt[0] == 0x8100) && (pkt[2] == 0x8100)) {
    TaggedEthernetTagged( );
}
elsif    ((pkt[0] == 0x8100) && (pkt[2] > 0x5DC)) {
    ReceiveError(ERROR_UnexpectedEtherType);
}
elsif    (pkt[0] == 0x8100) {
    ReceiveError(ERROR_InvalidTaggedFrame);
}
elsif    ((pkt[3] == 0xAAAA) && (pkt[4] == 0x0300) &&
         (pkt[5] == 0x0000) && (pkt[6] == 0x0800)) {
    TaggedEthernetIp( );
}
elsif    ((pkt[3] == 0xAAAA) && (pkt[4] == 0x0300) &&
         (pkt[5] == 0x0000) && (pkt[6] == 0x0806)) {
    TaggedEthernetArp( );
}
elsif    ((pkt[3] == 0xAAAA) && (pkt[4] == 0x0300) &&
         (pkt[5] == 0x0000) && (pkt[6] == 0x8847)) {
    TaggedEthernetMpls( );
}
elsif    ((pkt[3] == 0xAAAA) && (pkt[4] == 0x0300) &&
         (pkt[5] == 0x0000)) {
    ReceiveError(ERROR_UnexpectedEtherType);
}
elsif    (pkt[0] == 0x0800) {
    EthernetIp( );
}
elsif    (pkt[0] == 0x0806) {
    EthernetArp( );
}
elsif    (pkt[0] == 0x8847) {
    EthernetMpls( );
}
elsif    (pkt[0] > 0x5DC) {
    ReceiveError(ERROR_UnexpectedEtherType);
}
elsif    ((pkt[1] == 0xAAAA) && (pkt[2] == 0x0300) &&
         (pkt[3] == 0x0000) && (pkt[4] == 0x0800)) {
    EthernetIp( );
}
elsif    ((pkt[1] == 0xAAAA) && (pkt[2] == 0x0300) &&
         (pkt[3] == 0x0000) && (pkt[4] == 0x0806)) {
    EthernetArp( );
}
elsif    ((pkt[1] == 0xAAAA) && (pkt[2] == 0x0300) &&
         (pkt[3] == 0x0000) && (pkt[4] == 0x8847)) {
    EthernetMpls( );
}
elsif    ((pkt[1] == 0xAAAA) && (pkt[2] == 0x0300) &&
         (pkt[3] == 0x0000)) {
    ReceiveError(ERROR_UnexpectedEtherType);
}
else {
    ReceiveError(ERROR_InvalidPacket);
}
```

The present invention, a TCAM-based multi-dimensional and multi-way branch selector and method of operating the same, has thus been described. While the present invention has been described in particular embodiments, it should be appreciated that the present invention should not be construed as limited by such embodiments. Rather, the present invention should be construed according to the claims below.

What is claimed is:

1. In a data processing system having a processor and an associative memory unit for storing instructions, a method of processing multi-way branch selector instructions, the method comprising:
   (a) generating a branch decision key comprising a plurality of comparison fields;
   (b) comparing a first comparand to a second comparand to generate a comparison result;
   (c) generating a modified branch decision key that includes a third comparand and a comparison result;
   (d) removing the first comparand and the second comparand from the branch decision key;
   (e) concatenating remaining bits of the branch decision key with the comparison result, the comparison result having fewer bits that combination of the first comparand and the second comparand such that the modified branch decision key has fewer bits than the branch decision key;
   (f) retrieving an instruction reference from the associative memory unit in response to the modified branch decision key; and
   (g) providing the instruction reference to the processor for execution at a subsequent instruction cycle.

2. The method of claim 1, further comprising comparing the branch decision key to a plurality of pre-determined match values that are stored within the associative memory unit in parallel.

3. In a data processing system having a processor and an associative memory unit for storing instructions, a method of processing multi9-way branch selector instructions, the method comprising:
   (a) accessing a multi-way branch selector instruction;
   (b) generating a branch decision key, wherein the branch decision key includes a plurality of instruction-specified comparands, the instruction-specified comparands including a first comparand, second comparand, and a third comparand;
   (c) comparing the first comparand to the second comparand to generate a comparison result;
   (d) generating a modified branch decision key that includes the third comparand and the comparison result;
   (e) removing the first comparand and the second comparand from the branch decision key;
   (f) concatenating remaining bits of the branch decision key with the comparison result, the comparison result having fewer bits that combination of the first comparand and the second comparand such that the modified branch decision key has fewer bits than the branch decision key;
   (g) determining whether the modified branch key matches a respective one of a plurality of pre-determined match values that are stored within the associate memory unit;
   (h) provided the modified branch decision key matches a respective one of the match values, retrieving from the associative memory unit an instruction that is associated with the respective match value; and (i) providing the instruction reference to the processor.

4. The method of claim 3, wherein the determining comprises comparing the modified branch decision key to the plurality of pre-determined match values in parallel.

5. A processing system for processing multi-way branch selector instructions, comprising:
(a) an instruction bus;
(b) a processor unit coupled to the instruction bus, the processor unit operable for receiving from the instruction bus a stream of instructions including a multi-way branch selector instruction, the processor unit having a key generator operable for generating a branch decision key in response to the multi-way branch selector instruction, the branch decision key comprising a plurality of comparison fields; and
(c) a comparator unit coupled to receive the branch decision key from the processor unit, the comparator unit operable for comparing a first comparand to a second comparand to generate a comparison result and for generating a modified branch decision key that includes a third comparand and the comparison result;
(d) an associative memory unit coupled to the processor unit, the associative memory unit having stored therein a plurality of pre-determined match values and a plurality of instruction references that are associated with the match values, the associative memory unit operable for providing one of the instruction references to the processor unit for execution at a subsequent instruction cycle in response to a match between the modified branch decision key and one of the match values.

6. The processing system of claim 5, wherein the associative memory unit compares the branch decision key to the match values in parallel.

7. The processing system of claim 5, wherein the associative memory unit comprises a ternary content addressable memory.

8. A processing system for processing multi-way branch selector instructions, comprising:
(a) an instruction bus;
(b) a processor unit coupled to the instruction bus, the processor unit operable for receiving from the instruction bus a stream of instructions including a multi-way branch selector instruction, the processor unit comprising:
a key generator operable for generating a branch decision key in response to the multi-way branch selector instruction, the branch decision key comprising a plurality of instruction-specified comparands, the instruction-specified comparands comprising a first comparand, a second comparand, and a third comparand,
a branch decision key modification unit operable for comparing the first comparand to the second comparand to generate a comparison result, the branch decision key modification unit operable for generating a modified branch decision key that includes the third comparand and the comparison result;
(c) an associative memory unit coupled to the processor unit, the associative memory unit having stored therein a plurality of pre-determined match values and a plurality of instruction references associated with the match values, the associative memory unit operable for providing one of the instruction references to the processor unit for execution at a subsequent instruction cycle in response to a match between the modified branch decision key and one of the match values.

9. The processing system of claim 8, wherein the associative memory unit compares the modified branch decision key to the match values in parallel.

10. The processing system of claim 8, wherein the associative memory unit comprises a ternary content addressable memory.

11. The processing system of claim 8, wherein the modified branch decision key has fewer bits than the branch decision key.

12. A multi-way branch selector circuit for a processor, comprising:
(a) a branch decision key generation unit operable to receive a stream of instructions including a multi-way branch selector instruction, the branch decision key generation unit operable for generating a branch decision key that comprises a plurality of comparison fields; and
(b) an associative memory unit coupled to the branch decision key generation unit, the associative memory unit having stored therein a plurality of pre-determined match values and a plurality of instruction references that are associated with the match values, the associative memory unit operable for providing one of the instruction references to the processor for execution at a subsequent instruction cycle in response to a match between the branch decision key and one of the match values.

13. The circuit of claim 12, wherein the associative memory unit compares the branch decision key to the match values in parallel.

14. The circuit of claim 12, wherein the associative memory unit comprises
a ternary content addressable memory.

15. A multi-way branch selector circuit for a processor, comprising:
(a) a branch decision key generation unit operable to receive a stream of instructions including a multi-way branch selector instruction, the branch decision key generation unit operable for generating a branch decision key in response to the multi-way branch selector instruction, the branch decision key comprising a plurality of instruction-specified comparands that comprise a first comparand, a second comparand, and a third comparand;
(b) a comparator unit coupled to receive the branch decision key from the branch decision key generating unit, the comparator unit operable for comparing a first comparand to a second comparand to generate a comparison result and for generating a modified branch decision key that includes the third comparand and the comparison result;
(c) an associative memory unit coupled to comparator unit for receiving the modified branch condition key, the associative memory unit having stored therein a plurality of pre-determined match values and a plurality of instruction references associated with the match values, the associative memory unit operable for providing one of the instruction references to the processor for execution at a subsequent instruction cycle in response to a match between the modified branch decision key and one of the match values.

16. The circuit of claim 15, wherein the associative memory unit compares the modified branch decision key to the match values in parallel.

17. The circuit of claim 15, wherein the associative memory unit comprises a ternary content addressable memory.

18. In a data processing system having a processor unit and an associative memory unit, a method of processing multi-way branch selector instructions, comprising:
- (a) accessing a multi-way branch selector instruction;
- (b) generating a branch decision key, wherein the branch decision key includes a plurality of instruction-specified comparands;
- (c) removing a first comparand and a second comparand from the branch decision key;
- (d) concatenating remaining bits of the branch decision key with a comparison result, the comparison result having fewer bits than combination of the first comparand and the second comparand such that the modified branch decision key has fewer bits than the branch decision key;
- (e) determining whether the modified branch decision key matches a respective one of a plurality of pre-determined match values stored within the associative memory unit, the pre-determined match values being stored in association with a plurality of pre-determined jump offset values; and
- (f) provided the branch decision key matches a respective one of the plurality of pre-determined match values, retrieving an instruction reference indicating an address of an instruction to be executed by the processor unit.

19. The method of claim 18 wherein the determining comprises comparing the branch decision key to the plurality of pre-determined match values in parallel.

20. In a data processing system having a processor unit and an associative memory unit, a method of processing multi-way branch selector instructions, comprising:
- (a) accessing a multi-way branch selector instruction;
- (b) generating a branch decision key, wherein the branch decision key includes a plurality of instruction-specified comparands that comprise a first comparand, a second comparand, and a third comparand;
- (c) removing the first comparand field and the second comparand field from the branch decision key;
- (d) concatenating remaining bits of the branch decision key with the comparison result bits, the comparison result bits having fewer bits than the first comparand field and the second comparand field such that the modified branch decision key has fewer bits than the branch decision key;
- (e) comparing the first comparand to the second comparand to generate a comparison result field;
- (f) generating a modified branch decision key, the modified branch decision key including the third comparand and the comparison result field;
- (g) determining whether the modified branch decision key matches a respective one of a plurality of pre-determined match values stored within the associative memory unit, the pre-determined match values being stored in association with a plurality of pre-determined instruction references; and
- (h) provided the modified branch decision key matches a respective one of the plurality of pre-determined match values, retrieving an instruction reference indicating an address of an instruction to be executed by the processor unit.

21. The method of claim 20, wherein the determining comprises comparing the modified branch decision key to the plurality of pre-determined match values in parallel.

22. A method for processing multi-way branch instructions, comprising:

providing a branch decision key having a plurality of comparison fields containing a first comparand and a second comparand;

generating a modified branch decision key that includes a third comparand and a comparison result;

removing the first comparand and the second comparand from the branch decision key;

concatenating remaining bits of the branch decision key with the comparison result, the comparison result having fewer bits that combination of the first comparand and the second comparand such that the modified branch decision key has fewer bits than the branch decision key; and responding to the modified branch decision key, retrieving a reference to an instruction from an associative memory.

23. The method of claim 22, further comprising:

comparing the first comparand to the second comparand to generate the comparison result.

24. The method of claim 22, wherein the providing step-is performed by a processor.

25. The method of claim 22, further comprising providing the retrieved reference to the instruction to the processor for execution at a subsequent instruction cycle.

* * * * *